CIRCUIT ARRANGEMENT FOR CORRECTLY POSITIONING THE INFORMATION DERIVED FROM SCANNING A CHARACTER IN THE FIELD OF A CHARACTER READER

Filed Sept. 3, 1968 2 Sheets-Sheet 1

INVENTORS
Hanno Gillmann &
Paul Hauff
BY Spencer & Kaye
ATTORNEYS

CIRCUIT ARRANGEMENT FOR CORRECTLY POSITIONING THE INFORMATION DERIVED FROM SCANNING A CHARACTER IN THE FIELD OF A CHARACTER READER

Filed Sept. 3, 1968 2 Sheets-Sheet 2

INVENTORS
Hanno Gillmann &
Paul Hauff
BY Spencer & Kaye
ATTORNEYS

United States Patent Office 3,559,169

Patented Jan. 26, 1971

3,559,169

CIRCUIT ARRANGEMENT FOR CORRECTLY POSITIONING THE INFORMATION DERIVED FROM SCANNING A CHARACTER IN THE FIELD OF A CHARACTER READER

Hanno Gillmann and Paul Hauff, Konstanz, Germany, assignors to Telefunken Patentverwertungsgesellschaft m.b.H., Ulm (Danube), Germany Filed Sept. 3, 1968, Ser. No. 757,043
Claims priority, application Germany, Sept. 2, 1967, P 15 49 926.0
Int. Cl. G06r 9/04
U.S. Cl. 340—146.3 6 Claims

ABSTRACT OF THE DISCLOSURE

A circuit device for determining when the character reading information derived from scanning a character is in the proper position to be read by successively and cyclically shifting the binary representations associated with each succeeding row of elemental areas of the scanning field through a row of matrix elements, counting each time the row of memory elements contains a representation of the existence of a portion of the character, producing a control signal after a predetermined number of such occurrences, and then producing a reading signal after such a predetermined number of occurrences and approximately one shifting cycle after the first such occurrence.

BACKGROUND OF THE INVENTION

The present invention relates to a circuit for determining the correct reading position of a character in the evaluation device of a character reader which operates by scanning rows of picture elements and by producing binary signals representing the content of each picture element, and particularly to an arrangement wherein the scanning field is higher than the character itself.

In character reading machines it is usually required, before a character can be evaluated, or "read," that this character be in a predetermined position in a direction perpendicular to its movement through the scanning field of the machine and, on the other hand, that certain limitations on this position be maintained. This second requirement would mean that, for a text moving through the scanning field in the direction of the line of characters constituting the text, the characters may not be subjected to any noticeable variation in their position normal to the direction of movement and that each line of characters must be accurately aligned before being subjected to the reading process.

SUMMARY OF THE INVENTION

It is a primary object of the present invention to eliminate this requirement in the reading of lines of characters.

Another object of the invention is to permit substantial variations in the vertical positions of characters passing through a scanning field.

Yet another object of the invention is to accurately position the information relating to each character to enable the information to be properly evaluated by a character reader.

These and other objects according to the invention are achieved by the provision, in a circuit device for determining the correct character reading position for the information pertaining to a character and derived by scanning rows of elemental areas of a scanning field which is larger than the character and by producing a binary representation of the content of each such area, of a novel circuit arrangement for determining the instant when this information is properly located to permit its evaluation. This circuit arrangement is essentially composed of a memory unit for storing such binary representations and including a control row of memory elements, means associated with the unit for successively and cyclically shifting the binary representations associated with each succeeding row of elemental areas into the elements of the control row, and logic means associated with the control row for producing a signal in response to each shift which introduces into an element of the control row a representation of the presence of a portion of a character in the associated scanning field row. The circuit arrangement further includes counter means associated with the logic means for producing an output after a predetermined number of substantially uniformly spaced signals have been produced by the logic means, and reading control means responsive to the counter means output for initiating the reading of the character information after the counter output has been produced and at an instant corresponding approximately to one complete shifting cycle after the occurrence of the first signal from the logic means leading to the production of an output by the counter means.

Circuit arrangements according to the invention have the advantages of being relatively inexpensive and of not introducing any marked delays into the reading operation. They can be used particularly advantageously in conjunction with those readers which store the picture contents of a character and of its environment in a shift register. In such devices the present invention makes possible a substantial relaxation in the previously existing requirement for exact positioning of the character within the scanning field.

Moreover, it offers the possibility of eliminating the effects of faulty portions occurring in the character picture, if they fall below a certain limit, and to exclude them from the evaluation process.

The above mentioned special advantages of the present invention in readers having an appropriate shift register result from the fact that the shift register is divided, in a known manner, into sections by the provision of a plurality of tapping points and that each tapping point is connected to the logic system.

DESCRIPTION OF THE PREFERRED EMBODIMENTS

Figure 1:
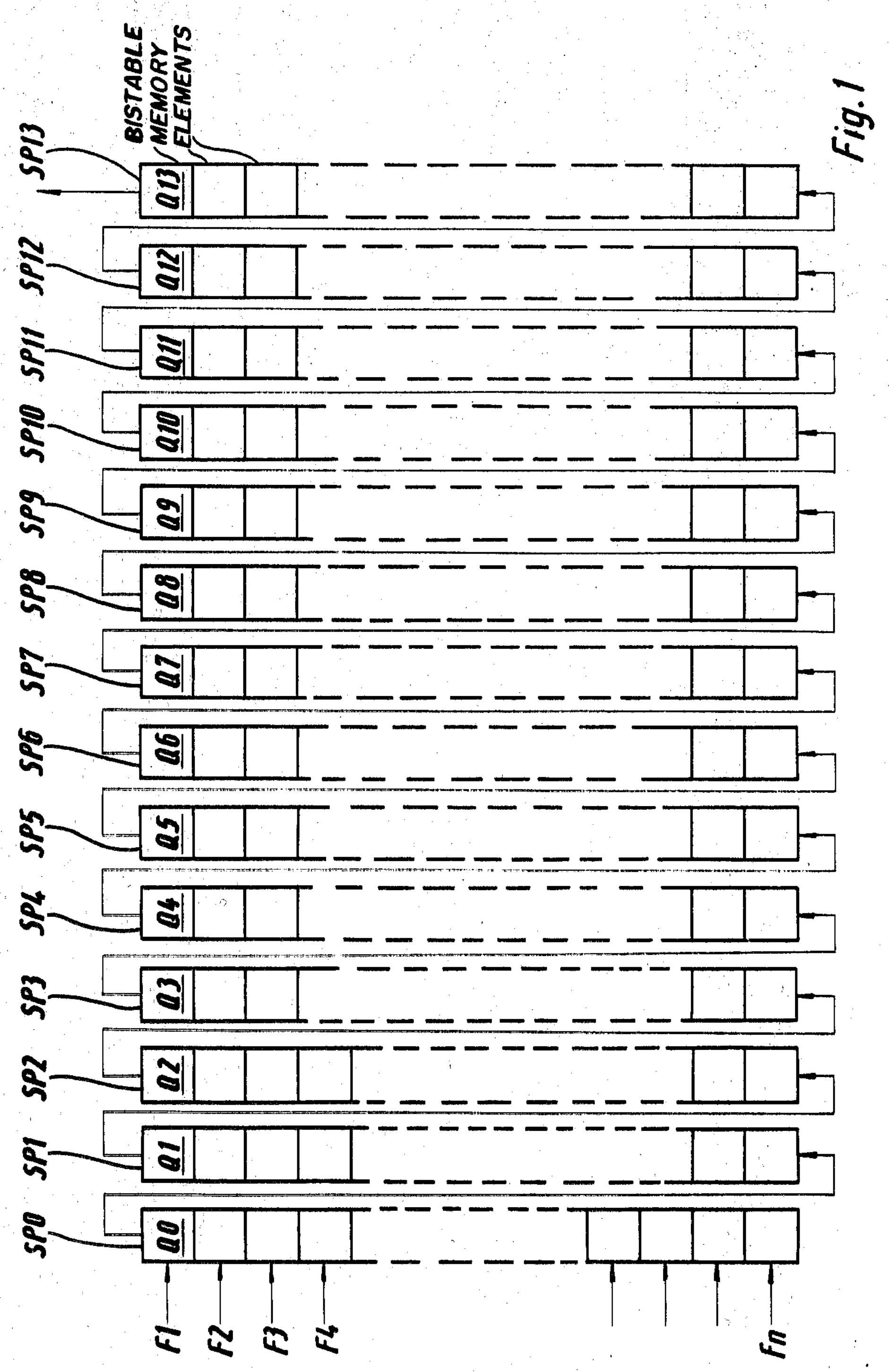
FIG. 1 is a schematic representation of a known recognition matrix constructed in the form of a shift register.

FIG. 1 shows a 14-column matrix having *n* information inputs $F_1$, $F_2$, $F_3$, $F_4$ . . . $F_n$ and consisting of bistable memory cells, with each column consisting of *n* elements. Each column, SP0, SP1, SP2 . . . SP13, is constructed in the form of a shift register, i.e. upon the occurrence of a signal from a shift pulse line common to all columns (not shown), each memory element accepts that binary information which was contained in the immediately preceding memory element just prior to the occurrence of the shift pulse. Within each matrix column, this shift occurs from the bottom to the top, and between columns from the uppermost element Q of each matrix column to the lowermost element of the next succeeding column, the columns being suitably connected together for this purpose. Thus, the entire matrix can be considered to be a single shift register, having 14 *n* bit locations.

The geometric arrangement of the memory elements is not limited to that shown in the drawing, which was selected merely to provide a spatial correspondence with the individual points, or elemental areas, of the reading field.

The character scanning can be performed by a column of $n$ photodiodes, extending transversely to the direction of movement of the characters and disposed in such a manner that the characters to be read move past it one after another. With this arrangement, the scanning field could be considered to move with the character, i.e. the photodiodes effectively traverse the scanning field associated with each character. Under the control of clock pulses the black-and-white patterns sensed by the photo elements are transferred as binary bits during the passage of a character therepast, e.g. 14 times for each matrix row, and the $n$-signals produced each time are fed via suitable amplifiers having a threshold value behavior and, if required, a special control circuit for generating a reference white value, to the lines F1, F2, F3, F4 . . . F($n$–1), F$n$ of the associated element of the first matrix column SP0. The shift pulses employed for moving the information within the matrix occur at a rate at least $n$ times as great as the frequency of the scanning by the photocell.

After a shift cycle produced by $n$ shift pulses, the black-and-white binary information which was first fed in parallel into the elements of first column SP0 via lines F1 to F$n$ will be stored in the second matrix column SP1. The information relating to the next succeeding black-and-white pattern sensed by the photo elements is then entered in parallel into column SP0.

In this manner each bit, whose value indicates whether a particular point in the character scanning field is black or white, moves through columns SP1 to SP13 of the memory matrix. After $n$ shift pulses have been applied, the same bit pattern will be found in the matrix, but it will have been moved to the right by one column. This produces the result that, when the parallel data inputs feed information into column SP0, the information stored in the memory matrix is a replica of the character presently in the scanning field and moves on through the matrix in synchronism with the movement of the character.

In the present example it is assumed that the movement at which a character has fully passed into the scanning field, i.e. the movement at which the entire black-and-white information of the characters is centered, with respect to the direction of movement of the characters, effectively the horizontal direction, in the matrix field, has been determined by other means which are of no interest here. If such means indicate by an appropriate "horizontally centered" signal that a character is completely within the scanning field and thus in the matrix, an alignment in the vertical direction, i.e. perpendicular to the direction of movement, must be accomplished in order to move the character information to a point in the matrix where the actual recognition can be performed.

In the example of the arrangement shown in FIG. 1, it is assumed that the evaluation position has been reached when, upon horizontal centering, the uppermost binary ONE-signals corresponding to (black picture points) of a character are contained in the upper matrix row, consisting of the uppermost memory elements Q0 to Q13 of the columns, i.e. when the character is in the "top center" position. It must here be mentioned again that this "vertical centering" takes place only within the memory matrix and that the character itself is only moved in the horizontal direction.

Figure 2:
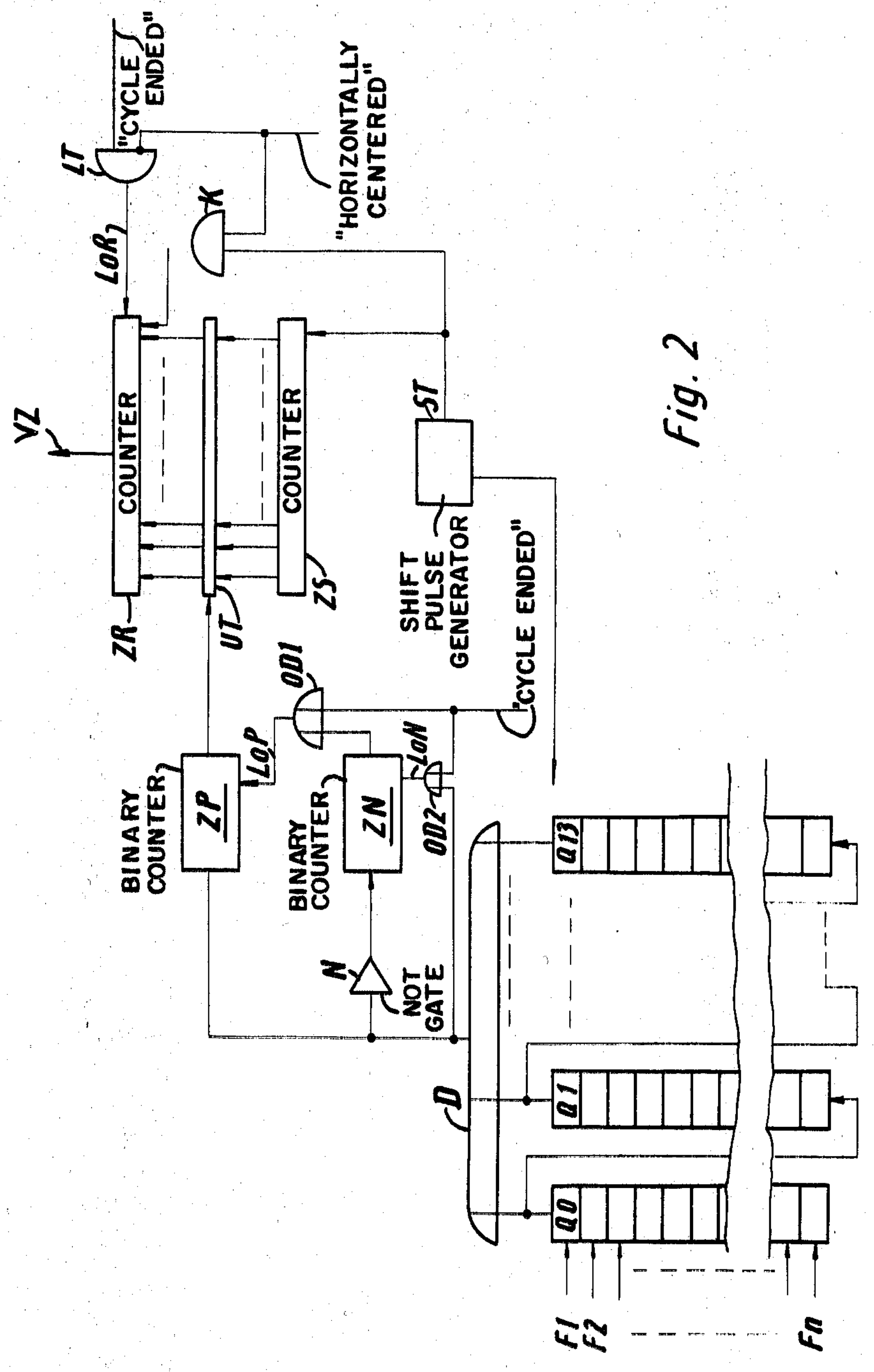
FIG. 2 is a circuit diagram of a circuit arrangement according to the present invention.

The uppermost elements Q0 to Q13 of the matrix columns, which are used as the "control row" are combined, as shown in FIG. 2, by being connected to the input of an OR element D whose output line is connected to the counting input of a binary counter ZP and, via a NOT-gate N, to the counting input of a further binary counter ZN. The counter ZP is so constructed that it emits a carry when fifteen counts have been made and this carry enables a transfer gate UT.

Since, in the printed image of a character, white-appearing breaks can occur even along a continuous black line and, conversely, black spots can occur in the white region surrounding a character, a further counter ZN of smaller capacity is provided which counts the binary ZERO signals from gate D, which signals correspond to that case where each of the uppermost elements of the matrix contains a white area signal. Its overflow output, together with a "cycle ended" signal, is connected to control an OR-element OD1. The output of the OR-element OD1 is connected to the erase line L$o$P of counter ZP. The "cycle ended" signal is applied, together with the output signal of gate D, to the erase line L$o$N of counter ZN via a further OR-gate OD2.

The shift pulses from generator ST, used for moving the data within the shift register matrix, are also fed to operate a shift pulse counter ZS having a capacity of $n$ counts, which corresponds to the number of elements in one matrix column. The content of this counter ZS indicates the progression of the shift cycle then being carried out. The counting positions of ZS are connected, via the transfer gate UT, to the corresponding positions of a reverse counter ZR also receiving the shift pulses via an AND gate K which is enabled by a "horizontally centered" signal. The erase line L$o$R of counter ZR is connected to the output of an AND NOT erase gate LT. To the negated input of gate LT the "horizontally centered" signal is also applied and its other input is connected to receive the "cycle ended" signal.

The operation of the circuit is as follows. Let it be assumed that, except for isolated binary ONE's which are caused by faulty printing of the character, only binary ZERO's are moved through the columns SP0 to SP13 of the shift register. As a result, the counter ZN, which can count only to three, for example, is always completely filled and erases, via OR gate OD1, any accumulated contents of counter ZP.

If, now, after several shift pulses, a portion of the information relating to a character line reaches register element Q0 or, subsequently, one of register elements Q1 to Q13, this will cause the gate OD2 to produce a signal which erases the contents of counter ZN and, in the case of a perpendicular character line, the counter ZP produces a count upon the occurrence of each subsequent shift pulse.

If the perpendicular line of a character is interrupted for a length, which corresponds to two shift pulses, for example, counter ZN will produce two counts but this will not be sufficient to effect an erasure of the contents of counter ZP and counter ZP will, therefore, continue to count. When counter ZP has accumulated a count corresponding to fifteen binary ONE's, its carry output enables transfer gate UT so as to cause the binary information present in the counter ZS at that moment to be transferred to the reverse counter ZR. Thereafter the shift pulses from generator ST continue to occur until the present shift cycle is completed.

At the end of a shift cycle, which is constituted by $n$ shift pulses, a "cycle ended" signal is produced by a suitable device (not shown). Simultaneously therewith, if centering of the character in the direction of movement has in the meantime been accomplished, in a manner which will not be discussed here in detail, a "horizontally centered" signal is produced. This "horizontally centered" signal is applied to gate LT, to prevent the erasure of the counter ZR contents and effects, via gate K, the application of the shift pulses to the counting input of ZR.

Thus, the count entered into the reverse counter ZR during the previous shift cycle is counted, at the shift pulse rate, down to a certain value, which is here assumed to be equal to the counting capacity of counter ZP, i.e. fifteen counts. When this counting level is reached, an output signal is emitted at output VZ to indicate completion of the centering process, this corresponding to the existence of information relating to the uppermost points of the character in the control row.

If it is assumed that $p$ (where $n>p\geqslant m$) shift pulses have occurred, since the beginning of an $n$-pulse shift cycle, before counter ZP has emitted a carry, and if furthermore the height of a character corresponds to more tha $m=15$ shift pulses, it must be concluded that no character information was present in the matrix columns, at the beginning of a shift cycle, in the uppermost $p-m$ memory elements of each column. At the beginning of a new shift cycle this number $p-m$, of shifts must first be made through the control row Q0 to Q13 before a binary signal corresponding to the uppermost character point appears in an element of the control row. The remainder $m=15$ which in the selected example must be contained in the reverse counter ZR in order to initiate an output signal, results from the above considerations.

At the start of each shift cycle, binary information relating to one vertical column of elemental scanning field areas is fed via inputs F1 to F$n$ to the memory elements of the first memory matrix column. Then, during the shift cycle the binary information relating to that column of scanning field areas and to the previously scanned columns of scanning field areas is transferred from one matrix column to the next. Thus, at the start of each shift cycle each memory matrix column contains binary information relating to the elemental areas of one scanning field column. Moreover, the order of the binary ONE's (black areas) and ZERO's (white areas) in the matrix columns coincides with the order of black and white elemental areas in the scanning field column. It thus results that the pattern formed by those memory elements in the binary ONE state coincides with the pattern of that portion of the character which has already been scanned and the vertical position of the binary ONE pattern corresponds with that of the character in the scanning field.

Therefore, the number of memory elements between the top of a matrix column and that memory element containing a binary ONE corresponding to the uppermost point of the character being scanned is proportional to the distance between the top of the character and a reference height of the scanning field.

Since a character is generally continuous, i.e., each point of the character is joined to every other point, except for accidental breaks which were discussed above, there will be in each horizontal matrix row between the rows corresponding to the top and bottom of the character at least one memory element containing a binary ONE, at least after the entire character has been scanned. It is for this reason that a binary ONE will normally be applied to gate D for each shift pulse which occurs after the pulses required for shifting the binary ONE, or ONE's, corresponding to the top of the character into the respective elements of control row Q0 to Q13. Those situations where there might be an isolated black area in the scanning field above the character or a break in the character are compensated for by the action of counter ZN, as explained above.

Assuming that no such breaks exist in the character under consideration, the following will occur during a shift pulse cycle: Each shift pulse will be counted by counter ZS and will shift the contents of each memory element upwardly to the next memory element. This will cause a binary ONE to eventually appear in an element Q0 to Q13 of the matrix control row and thereafter each shift pulse will cause a signal to be applied to at least one input of gate D and hence a count to be made by counter ZP. Counter ZP will reach a count of fifteen after fifteen shift pulses have each resulted in the appearance of at least one binary ONE in the matrix control row.

At this moment, counter ZS will contain a count equal to fifteen plus the number of shift pulses which occurred before the first binary ONE appeared in the matrix control row, this number of shift pulses being equal to the number of memory elements between the top of a matrix column and the element containing a binary ONE corresponding to the top of the character at the start of a shift cycle.

Therefore, after the contents of counter ZS have been delivered to counter ZR, the number of shift pulses which must be delivered to counter ZR, from the beginning of the shift cycle following the appearance of a "horizontally centered" signal, to bring its count down to fifteen is equal to the number of shift pulses required to bring the binary ONE or ONE's corresponding to the top of the character into the matrix control row Q0 to Q13. It follows that a "read" signal will appear at output VZ when, during the shift cycle following the occurrence of a "horizontally centered" signal, information relating to the top of the character is contained in the matrix control row and the information relating to the rest of the character is contained in the subjacent matrix rows.

Thus, the circuit according to the invention actually serves to vertically "center" the information relating to a character without subjecting the character itself to any vertical displacement relative to the scanning field.

It is possible to use another matrix row as the "control row" instead of the first matrix row described here. Moreover, the evaluation field of the matrix, which was here assumed to be at the upper end, can be moved further down independently of the position of the control row. Appropriately different considerations will then apply to the contents counter ZR should have in such a case to initiate an evaluation signal.

The above-described circuit arrangement for determining the vertical centering of a character has the advantage that it does not delay the shift process, for example, when used in character readers employing a shift register, and thus does not cause any delay in the normal reading procedure. The circuit arrangement is also suited for preliminary centering a character when a more exact centering is to be accomplished according to other criteria which are more closely adapted to the requirements of the individual characters.

In the above-described centering device it was assumed that the height of all characters was uniform. Even in such a case, however, dimensions other than those of the actual characters will exist for a few special symbols or for punctuation marks. For this reason a second or third device of the same type can be provided parallel to the two counters ZP and ZN and each can be dimensioned for a different counting level.

To accomplish the same result, counter ZP can also be so constructed as to enable the transfer gate UT after, for example, 5 counts so that the contents of counter ZS are then transferred into the reverse counter ZR. In the case where the character to be read presents the full character height, the subsequent enabling of the transfer gate UT at a ZP count of "15" would act to transfer the previous contents of reverse counter ZR. In the case where a character does not cover the full character height, counter ZP will not reach a count of "15" so that now the value transferred into the reverse counter ZR at a counter value of "5" will determine the evaluation, or reading, moment of the character being read.

For those special symbols which do not cover the full character height, or for punctuation marks, it is also necessary to place stricter requirements on the line interruptions permitted within the printed image. This could be accomplished by providing counter ZN with a tap via which the contents of counter ZP can be erased at an intermediate point in the count performed by counter ZN. Such an erasure would have to be dependent on whether or not the contents of counter ZP has reached a predetermined level corresponding to the height of the punctuation mark or the special symbol.

The use of an OR-gate D to combine the binary values present in the control row Q0 to Q13 represents a particular simple special case. Instead of gate D it is also possible to use complicated linkages for the signals. For example, it would be possible to link each two adjacent column elements to an AND gate which would correspond to the requirement for a minimum line thickness and the AND gates can then be connected together to an OR gate. This would result in the linkage: $Q0 \cdot Q1 + Q1 \cdot Q2 + Q2 \cdot Q3$ etc.

It is also conceivable to construct a logic system which is not controlled exclusively by the signals from the elements of one matrix row. A system can be employed, for example, which emits a signal only when the occurrence of a binary ONE in one matrix element coincides with the presence of a binary ONE in at least one or two of the eight surrounding matrix elements.

It must be noted that the above-described manner of centering can be used with advantage not only in readers having a shift register but also in machines which effect a serial scanning, by rows or columns, and can be used for centering in both the vertical and the horizontal direction.

Instead of deriving the character information required for centering of a character from the shift register or from some other information memory, it is also possible, for example, in readers which simultaneously scan entire characters in the parallel mode, to derive this character information directly from the scanning elements or from pulse stages connected directly thereto.

It will be understood that the above description of the present invention is susceptible to various modifications, changes and adaptations.

What is claimed is:

1. In a circuit device for determining the correct character reading position for the information pertaining to a character and derived by scanning rows of elemental areas of a scanning field which is larger than the character and by producing a binary representation of the content of each such area, the improvement comprising: a memory unit for storing such binary representations and including a control row of memory elements; means associated with said unit for successively and cyclically shifting the binary representations associated with each succeeding row of elemental areas into the elements of said control row; logic means associated with said control row for producing a signal in response to each shift which introduces into an element of said control row a representation of the presence of a portion of a character in the associated scanning field row; counter means associated with said logic means for producing an output after a predetermined number of substantially uniformly spaced signals have been produced by said logic means; and reading control means responsive to said counter means output for initiating the reading of the character information after said counter output has been produced and at an instant corresponding approximately to one complete shifting cycle after the occurrence of the first signal from said logic means leading to the production of an output by said counter means.

2. An arrangement as defined in claim 1 wherein said memory unit is constituted by a shift register whose bit locations are arranged to store the binary representations of the contents of the elemental areas, said shift register being divided into a plurality of sections with one element of each said section constituting one element of said control row and being connected to said logic means.

3. An arrangement as defined in claim 2 further comprising second counter means connected to said logic means for producing a count in response to each shift which does not introduce into any element of said control row a representation of the presence of a portion of a character in the associated scanning field row, said second counter being connected to be erased by each signal from said logic means and being connected to the first said counter means for erasing the contents thereof when said second counter means reaches a predetermined count.

4. An arrangement as defined in claim 2 wherein said reading control means comprise: a shift register counter connected to produce a count of each shift produced by said means for shifting; a reverse counter arranged to produce an output signal when it reaches a predetermined count; transfer gate means connected between said shift register counter and said reverse counter and associated with said counter means for transferring the content of said shift register counter into said reverse counter when said counter means produces an output; and means associated with said reverse counter for causing it to count down in response to each shift produced by said means for shifting during the shifting cycle following the production of an output by said counter means.

5. An arrangement as defined in claim 3 wherein said counter means are arranged for emitting a separate output after a smaller number of substantially uniformly spaced signals have been produced by said logic means.

6. An arrangement as defined in claim 5 wherein said second counter means are arranged to erase said first-mentioned counter means upon the occurrence of a smaller number of counts by said second counter means only if the count then appearing in said first-mentioned counter means is less than a certain value.

References Cited

UNITED STATES PATENTS 3,104,369 9/1963 Rabinow et al. ---- 340—146.3

THOMAS A. ROBINSON, Primary Examiner